United States Patent [19]

Dumas

[11] 4,254,478
[45] Mar. 3, 1981

[54] MEASUREMENT OF DISTANCE USING ULTRASONIC SIGNALS

[75] Inventor: Jean-Claude Dumas, Auriol, France

[73] Assignee: Compagnie Francaise des Petroles, Paris, France

[21] Appl. No.: 51,298

[22] Filed: Jun. 22, 1979

[30] Foreign Application Priority Data

Jun. 28, 1978 [FR] France .................................. 78 19265

[51] Int. Cl.³ ............................................. G01S 15/08
[52] U.S. Cl. ........................................ 367/2; 367/902
[58] Field of Search ................................ 367/2, 6, 902

[56] References Cited

U.S. PATENT DOCUMENTS

| | | | |
|---|---|---|---|
| 3,237,150 | 2/1966 | Beck et al. ........................ | 367/902 X |
| 3,495,208 | 2/1970 | Grada .............................. | 367/902 X |
| 4,026,654 | 5/1977 | Beaurain .............................. | 367/6 X |

Primary Examiner—Richard A. Farley
Attorney, Agent, or Firm—Sughrue, Rothwell, Mion, Zinn and Macpeak

[57] ABSTRACT

In the measurement of the distance between two immersed points using ultrasonic signals, a control beacon is located at one point and a servo-beacon at the other point. The control beacon emits a first signal which is received by the servo-beacon. After a set period of time T sufficient for the disappearance of all echoes, the servo-beacon emits a signal which is received by the control beacon. Measurement apparatus associated with the control beacon determines the distance as a function of the time between emission of the first signal by the control beacon and reception of the signal from the servo-beacon, and the velocity of the ultrasonic signal which is determined in the region of the control beacon.

10 Claims, 3 Drawing Figures

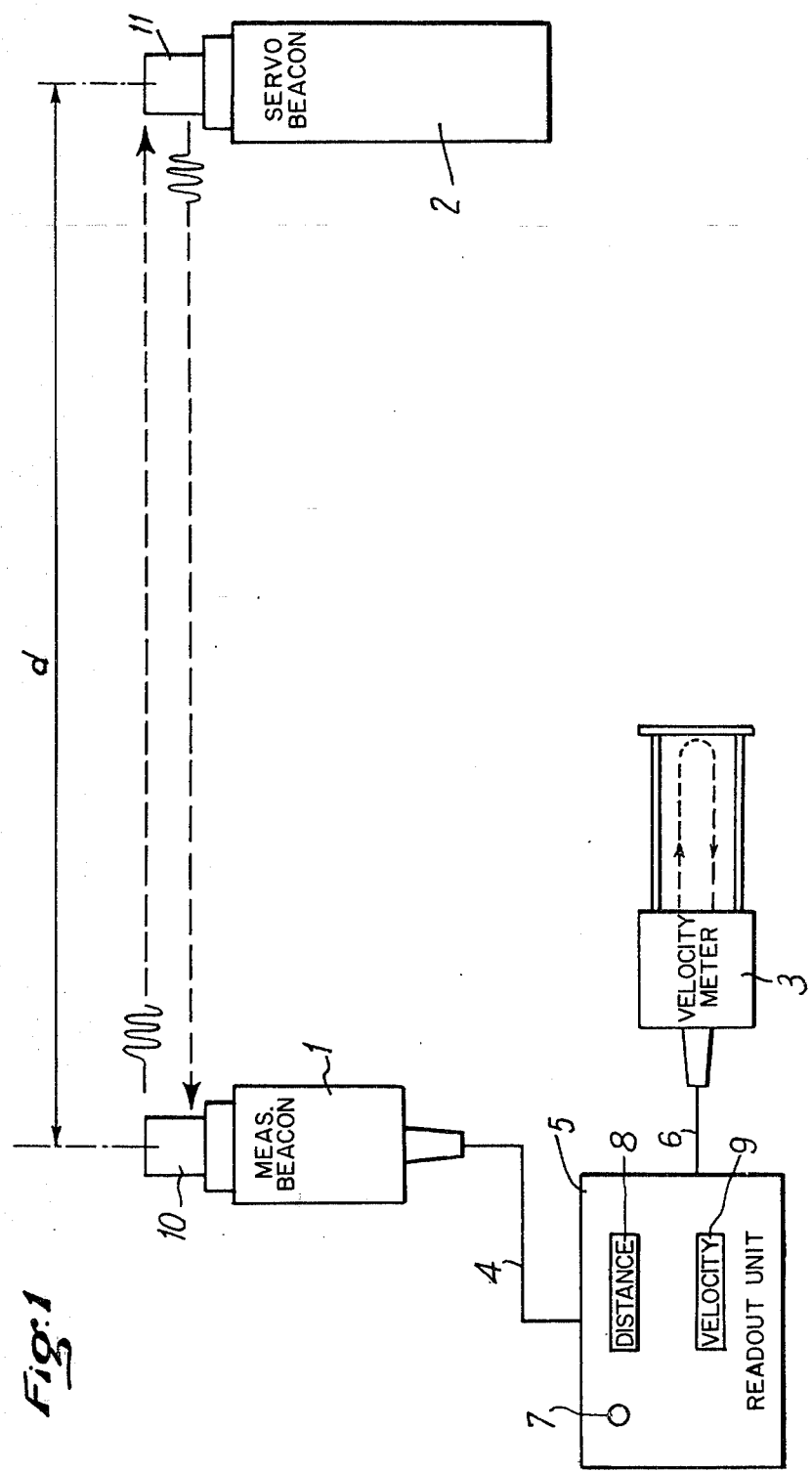

MEASUREMENT OF DISTANCE USING ULTRASONIC SIGNALS

The invention relates to a process for the precise measurement of a distance in water by controlled emissions and receptions of ultrasonic signals with a view to eliminating stray echoes.

Known processes for the measurement of distance by the emission of an ultrasonic signal and reception of the echo generated on an obstacle, it being desired to know the distance between the obstacle and the point of emission of the signal, all have the major disadvantage that they give rise to an uncertainty resulting from a multiplicity of stray echoes.

Such an uncertainty is all the more troublesome because the distance to be measured may lie in a zone in which the speed of the ultrasonic signals is different from the speed at the surface of the water, because these distances can themselves vary within wide proportions, and because the desired main echo may not be received.

There exist a very large number of methods for making it possible to select echoes by filtering the echoes received, both in terms of frequency and amplitude, but these methods do not make it possible to remove the final uncertainty. In addition, they make it necessary to measure the speed of propagation of the ultrasonic signal at the point in question.

According to the invention there is provided a process for the measurement of the distance between two immersed points using the detection of the duration of propagation of ultrasonic signals between said points, comprising placing an emitting and receiving control beacon at one of said points and a receiving and emitting serve-beacon at the other of said points, causing said control beacon to emit a signal and then remain unresponsive to any signal received thereby during a period of which the duration is greater than the time of travel of a signal between said two beacons, causing said servo-beacon to remain unresponsive to any stray signals and echoes for a period of time T following the reception of a signal emitted by said control beacon, causing said servo-beacon to emit a signal at the end of said period T, which signal is received and detected by said control beacon, and determining the distance d separating said two beacons as a function of the velocity of the ultrasonic signal at one of said points and of the interval of time separating a signal emitted by said control beacon and the first signal received by said servo-beacon.

The above process can have the advantage of removing any uncertainty, since it suffices to envisage a period T, the duration of which is sufficient to be certain of removing all the echoes resulting from the signal emitted by the control beacon.

In addition, since the signal emitted by the servo-beacon can be an undeformed pure signal, the precision of the measurements can be considerably enhanced, even for substantial distances, without it being necessary to create expensive emitters and receivers.

Having determined the period T for the maximum distance which is likely to arise, an absence of response during a determined period can easily be detected by the servo-beacon.

Preferably the control beacon is arranged to automatically emit a signal after a determined period in the event of non-response from the servo-beacon.

Similarly, the process makes it possible to check the measurements, as soon as the measuring beacon again picks up the responses from the servo-beacon, by automatic repetition of the measurements, it being possible for the duration of each cycle to be $2(t+T)$, in which t is the propagation time of the signal travelling the distance d and T is the period of silence for the disappearance of stray echoes.

The invention will be more fully understood from the following description of an embodiment thereof, given by way of example only, with reference to the accompanying drawings.

In the drawings:

FIG. 1 is a schematic representation of a control beacon and of a servo-beacon;

Figure 3:
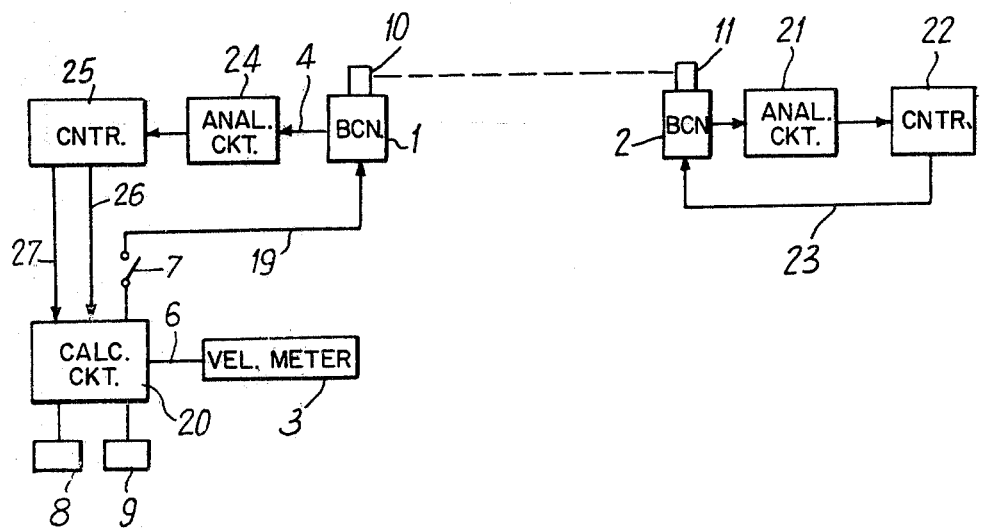
FIG. 3 is a block diagram of an example of a circuit associated with the beacons of FIG. 1.

The means for carrying out an embodiment of a process according to the invention for the measurement of the distance d between two immersed points comprise a control or measuring beacon 1 and a servo-beacon 2 placed at respective ones of these points. The beacon 1 is connected by line 4 to a control and read-out unit 5 which also receives signals from a velocity meter 3 via line 6.

The unit 5 comprises a control button 7 for operating the control beacon 1, a window 8 for displaying the calculated distance and a window 9 for displaying the speed of propagation of the ultrasonic signal at the point in question, that is to say at the point of measurement of the velocity meter 3.

The emitting-receiving devices 10 and 11 of the beacon 1 and of the servo-beacon 2 respectively can be of any suitable type. This also applies to the velocity meter 3 and it will be understood that the circuits which make it possible to register, at window 9, the speed measured by the velocity meter 3, and also the circuits for calculating the distance d displayed at the window 8, can be of any suitable type, provided they give the distance d in accordance with the process described below and represented schematically in FIG. 2.

Figure 2:
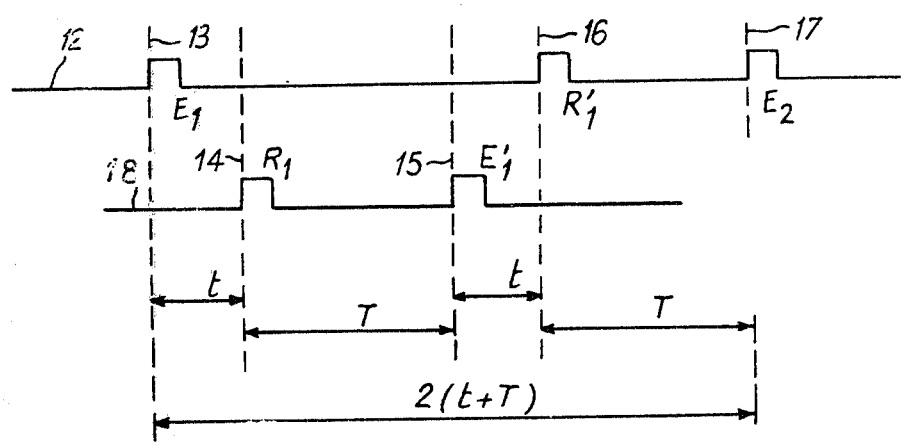
FIG. 2 is the diagram of the emission and reception signals of the beacons.

In FIG. 2, line 12 is the representation, with time, of two successive signals emitted by the beacon 1, signal $E_1$ being emitted at instant 13, and signal $E_2$ being emitted at instant 17, and of the reception $R'_1$, at instant 16, of a signal $E'_1$ emitted at the instant 15 by the servo-beacon 2 and represented by the line 18. Line 18 also shows by $R_1$ the reception at instant 14 by the beacon 2 of the signal $E_1$ emitted at the instant 13.

The measuring beacon 1 can provide the value of the distance $d = vt$, in which v is the velocity indicated by the measuring apparatus 3 of the ultrasonic signal in water during the time taken to travel a known distance once in both directions. The value of the distance d can be obtained by measuring the time from instant 13 either to the instant 16 of the reception $R'_1$ of the signal $E'_1$ emitted by the beacon 2, or when the signal $E_2$ is emitted at the time 17. In the latter case, the emission $E_2$ at 17 takes place after a time $T_2$. which is equal to $2(t+T)$, the intervals 13–14 and 15–16 being equal to t and the intervals 14–15 and 16–17 being equal to T. The distance d is then equal to $(T_2 - 2T)(v/2)$. In the first case, the duration $T_1$ between the emission time 13 and the reception time 16 of the measuring beacon is resolved into two intervals equal to t and a single period T. The distance d is then equal to $(T_1 - T)(v/2)$.

In both cases, the measurements can be very precise, the durations of silence T being known with very high precision by using a quartz clock which can be the same on each of the two beacons, and the durations t corresponding exclusively to the time of travel of the signals and not to those of possible stray echoes.

In general terms, the beacon 1, FIG. 3, emits a pulse of frequency f for a duration $t_0$ which is short relative to the duration t for travelling the distance d. This emission is effected by closing a contact 7 of a circuit 19 connecting the feed and calculating circuits 20 to the emission circuit of the beacon 1.

When the pulse $E_1$, emitted at the instant 13, is received after time t by the beacon 2, the signal is analysed by circuits 21 in order to ensure that this is indeed a signal emitted by the beacon 1. It is transmitted to a time counter 22, the purpose of which is to trigger the emission control circuit 23 at the end of the interval of time T, at which it is certain that all stray echoes due to the emission from the beacon 1 will have disappeared. At this instant, the circuit 23 triggers the emission of the pulse $E'_1$ at the instant 15, and blocks the reception-detecting circuits for a further period T.

When the emission circuits of the beacon 1 have been controlled for a time greater than the period T, the reception circuits are ready to receive the pulse emitted by the beacon 2. The signal received is transmitted to a circuit 24 for analysing the signal, which triggers time counter 25. After the period T has elapsed, the circuits 26 and 19 cause the emission of a further pulse $E_2$ at instant 17, FIG. 2. On receiving the value of the velocity of the ultrasonic signal in water from the measuring apparatus 3, the calculating circuits 20 cause the calculated distance d to be displayed on the window 8.

As has been stated, the calculating circuits can be of any suitable type and can provide the value d, either after the time T+2t or after the time 2(T+t), in particular if a re-emission $E_2$ is envisaged.

The displays of the velocity of the ultrasonic signal at window 9 and of the distance d at window 8 can obviously be replaced or duplicated by transmitting and recording circuits. Similarly, the circuits for controlling the emissions and receptions of pulses can be of any known suitable type, provided that they are placed under the control of the time counter 25, in accordance with the above process.

As regards the analysing circuits 24, they depend on the pulses emitted and can be omitted if the medium in question does not give rise to stray signals.

In the event of the non-response of the beacon 2 after a given time, a circuit 27 triggers the automatic emission of a further pulse by the beacon 1, until the emission pulse is received from the beacon 2.

An extremely convenient, precise and safe means for determining distance, regardless of the depth, is therefore produced. Since the apparatus is of low bulk, it can be used by any diver or, in the case of very great depth, it can be lowered by any known and suitable means.

What is claimed is:

1. A method for measuring the distance between a control beacon and a servo beacon immersed underwater, comprising the ordered steps of:
   (a) emitting a first ultrasonic pulse signal from the control beacon,
   (b) simultaneously disabling receiver means on said control beacon for a first time period greater than the travel time of said first signal between said control and servo beacons,
   (c) receiving said first pulse signal at said servo beacon,
   (d) simultaneously disabling receiver means on said servo beacon for a second time period T to prevent the detection of echoes or reflections of said first pulse signal from other objects,
   (e) emitting a second ultrasonic pulse signal from said servo beacon at the expiration of said time period T, said second pulse signal having a freqency equal to that of said first pulse signal,
   (f) receiving said second pulse signal at said control beacon,
   (g) measuring the velocity of an ultrasonic pulse signal in water at said control beacon, and
   (h) determining the distance between said two beacons as a function of said measured velocity and the propagation time of said first and second pulse signals between the respective beacons.

2. A method as claimed in claim 1, further comprising: emitting a further pulse signal from the control beacon at the expiration of a time period T after the reception thereby of the second pulse signal from said servo beacon.

3. A method as claimed in claim 2, wherein said periods separating the instant of reception of a signal and the instant of emission of a signal by said beacons are the same for each of said two beacons.

4. A method as claimed in either claim 2 or claim 3, wherein the distance is determined as a function of the interval of time separating two consecutive emissions from said control beacon.

5. A method as claimed in claim 1, wherein the emission of a signal from said control beacon takes place automatically in the event of the non-reception of a signal from said servo-beacon following the emission of a signal by said control beacon.

6. A method as claimed in claim 1, wherein the velocity of said ultrasonic signals at said control beacon is measured each time the distance between said two beacons is determined.

7. A method as claimed in claim 1, wherein the signals emitted by said two beacons are identical in duration, the measurement of the velocity being effected by means of identical signals over a return path to the control beacon.

8. A method as claimed in claim 1, wherein the emission of a signal by a said beacon is controlled by a clock which determines the disabling time period.

9. A method as claimed in claim 8, wherein said clock controls the time of non-reception of the signal emitted by said servo-beacon.

10. A method as claimed in claim 1, in which the signals emitted by said two beacons are each controlled by a respective quartz clock, said clocks having the same frequency.

* * * * *